United States Patent [19]

Bates

[11] 4,076,423
[45] * Feb. 28, 1978

[54] OPTICAL COHERENCE MEASURING DEVICE

[76] Inventor: Harry E. Bates, 240 E. Ridgewood St., Orlando, Fla. 32801

[*] Notice: The portion of the term of this patent subsequent to Dec. 23, 1992, has been disclaimed.

[21] Appl. No.: 640,050

[22] Filed: Dec. 12, 1975

Related U.S. Application Data

[63] Continuation of Ser. No. 518,759, Oct. 29, 1974, Pat. No. 3,927,945.

[51] Int. Cl.$^2$ .............................................. G01J 4/00
[52] U.S. Cl. .................................. 356/114; 356/106 R
[58] Field of Search ............................ 356/106 R, 114

[56] References Cited

U.S. PATENT DOCUMENTS

| | | | |
|---|---|---|---|
| 3,134,840 | 5/1964 | Gamo | 356/106 R |
| 3,160,696 | 12/1964 | Gamo | 356/106 R |

Primary Examiner—John K. Corbin
Attorney, Agent, or Firm—Duckworth, Hobby & Allen

[57] ABSTRACT

A system for measuring the complex degree of coherence of beams of optical radiation is disclosed. The system generally consists of a polarizer for preparing initially the state of the radiation field entering the device, a retarder oriented so as to divide the polarized beam into two orthogonally polarized components with a specific relative temporal retardation, and an electro-optic modulator which modulates the relative temporal phase shift as a function of time. The resultant beam is divided into three beams having independent states of polarization so that each is caused to fall upon a separate detector. The teachings of this disclosure show how these three measurements of intensity together with the known degree of modulation can be used to compute the complex degree of coherence and also the mean wavelength of quasi-monochromatic light analyzed by the system.

8 Claims, 3 Drawing Figures

OPTICAL COHERENCE MEASURING DEVICE

This is a continuation of application Ser. No. 518,759 filed Oct. 29, 1974 now U.S. Pat. No. 3,927,945.

BACKGROUND OF THE INVENTION

1. Field of the Invention

This invention generally relates to devices for performing an analysis of optical radiation. More particularly, the present invention concerns an optical arrangement which may be employed to measure simultaneously and instantaneously the complex degree of coherence of optical radiation emanating from quasi-continuous (CW) sources and pulsed sources within its field of view. In addition, for quasi-monochromatic sources the device can be employed to measure mean wavelength as well.

The measurement of coherence of optical radiation is useful for many purposes. Coherence is an indicator of the bandwidth of a quasi-monochromatic source. The coherence of laser light is dependent on the mode properties of the laser. Thus, if the laser is operating in a single longitudinal and transverse mode, the coherence will be greater than if the laser is operating in two or more modes simultaneously. Thus, the invention in an appropriate embodiment will be able to discriminate instantaneously between multimode and single mode operation of a laser. This information is useful, for example, in holography. Because a certain minimum degree of coherence is necessary for holographic imaging. The ability to measure wavelength is especially useful. The invention can be used in conjunction with tunable laser systems to continuously monitor coherence and wavelength.

It will be readily understood by those skilled in the art, in view of the following detailed disclosure, that these methods and techniques for measuring the complex degree of coherence and wavelength are suited for employment in a great variety of applications. It is also to be understood that the invention is not to be limited in its manner of employment and many specific uses are contemplated although, for purposes of brevity, not enumerated separately in detail. It is specifically pointed out that the present invention comprehends employment of the methods and apparatus both alone and in combination with conventional apparatus such as prisms, lenses, gratings, laser devices, spectrographs, optical receivers, optical sources, and modulated optical communication links.

2. Description of the Prior Art

There are many well known methods for measuring the wavelength of an optical source. These include scanning monochrometers, spectrographs, and Fourier transform spectrometers. A Michelson interferometer can be used to measure the fringe visibility of a quasi-monochromatic source. However, a sequential measurement of the fringe pattern as a function of time is required. The fringe pattern must then be analyzed to calculate the complex degree of coherence as a function of path difference. Whereas the invention to be disclosed in the following sections can instantaneously and continuously measure the variables necessary for computing either by analogue or digital methods the complex degree of coherence. It will be obvious to one skilled in the art that this technique is a significant improvement over prior art. Techniques have been developed for measuring the coherence length of a single pulse of optical radiation (see for example, Dandliker et al. U.S. Pat. No. 3,776,636 and R. A. Patten, U.S. Pat. No. 3,764,217). These techniques require the use of photographic film or other recording medium for measuring coherence length. Whereas the present invention disclosed in the following discussion can measure the complex degree of coherence instantaneously and without the need for the development of photographic film. This advantage over prior art is especially important and can be used to advantage where it is desired to measure the width of an absorption or emission line of optical radiation as a function of experimental parameters such as pressure, temperature, or electric field.

Thus a need exsists for a technique and apparatus for measuring the complex degree of coherence and wavelength on a continuous and instantaneous basis.

SUMMARY OF THE INVENTION

Accordingly, this invention provides a means for studying the complex degree of coherence and mean wavelength of beams of optical radiation comprising: optical means for polarizing the radiation; means for dividing the resulting polarized beam into two independent orthogonally polarized components; means for generating a phase retardation between the two independent orthogonally polarized components; means for generating a time dependent modulation in the degree of phase retardation between the two independent orthogonally polarized components; means for analyzing the coherency matrix of the resulting beam by measuring the intensity of the beam after passage through optical elements which project the beam into three independent states of polarization such that the three said intensities supply all information needed to calculate the three independent elements of the coherency matrix; means for detecting the three independent intensities and thus converting them into electric analogue signals; and means for calculating the complex degree of coherence and mean wavelength from the three independent intensities and attendant modulation values.

Briefly, in an embodiment the objects of the invention are achieved according to the teachings of the present invention by polarizing the radiation to be analyzed into a prepared state of polarization, dividing the polarized beam into two equal and orthogonally polarized components, and passing these components through an optical element which generates a relative phase shift $\tau$ between the two components. The light is then caused to pass through a modulator which generates a time varying phase shift between the two orthogonally polarized components. The resulting beam is split into three parts by spacial and polarizing beam splitters. One part is caused to pass through an achromatic phase shifter which introduces an additional $\pi/2$ retardation between the orthogonally polarized components. The three beams thus generated are then caused to fall on three optical detectors which generate analogue signals proportional to the three intensities. As will become apparent to one skilled in the art after reading the detailed description below the elements of the optical coherence matrix can be calculated from the three measured intensities by analogue or digital means and thus the complex degree of coherence can be calculated. If the complex degree of coherence and the degree of modulation are measured for two or more successive observations the mean wavelength of the optical radiation can be calculated assuming that it is monochromatic.

Other advantages and novel features of the invention will become apparent when considered in conjunction with the accompanying drawings wherein:

DESCRIPTION OF THE PREFERRED EMBODIMENT

Figure 1:
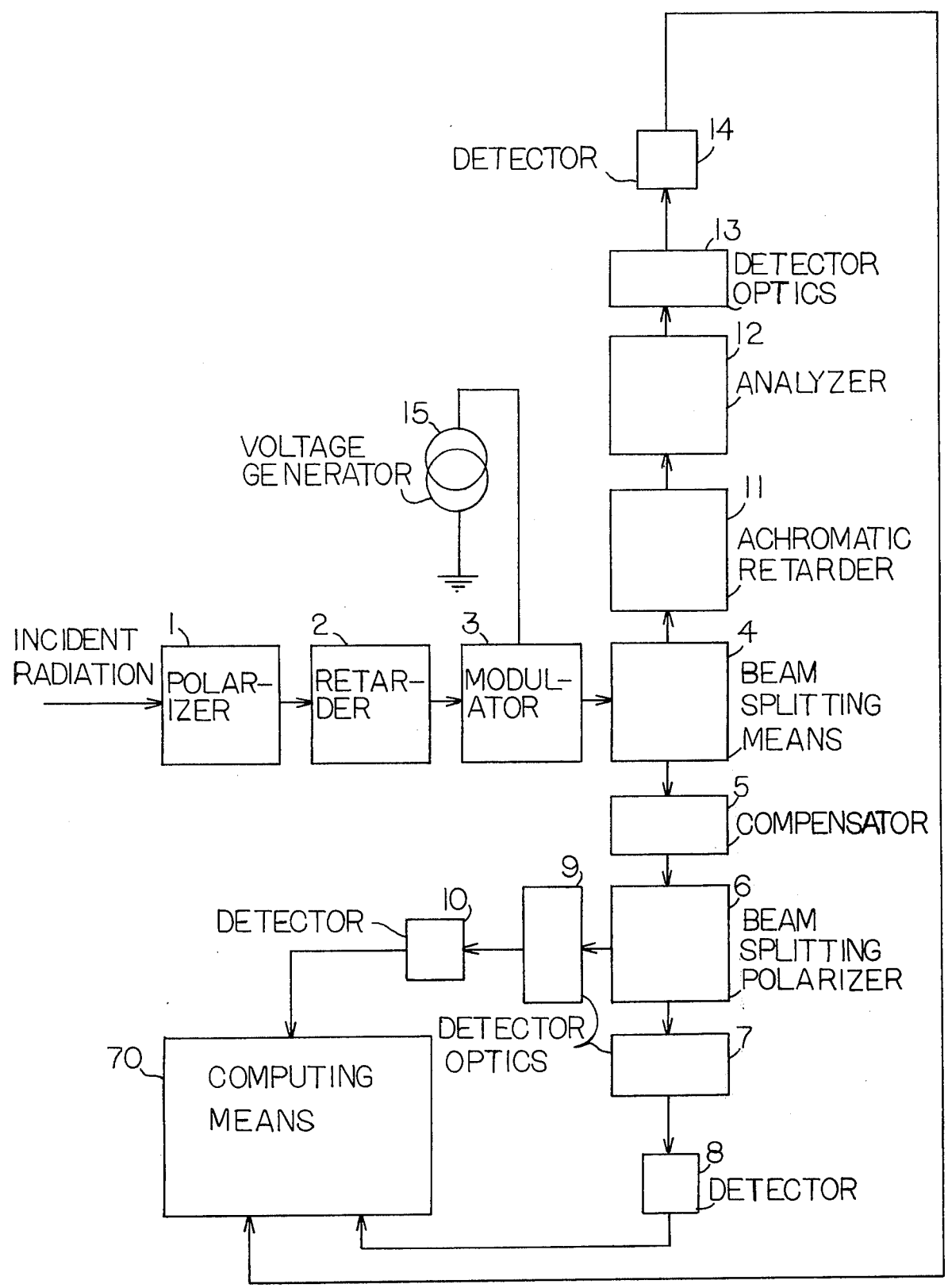
FIG. 1 is a schematic block diagram illustrating a preferred embodiment of the present invention.

An understanding of the theoretical concepts associated with the present invention is a prerequisite to an appreciation of the function of the present invention. The following discussion includes a mathematical analysis describing the unusual function of the present invention.

The coherent state of polarization of a quasi-monochromatic radiation field is represented by its Jones' vector, $$E = \begin{pmatrix} E_x \\ E_y \end{pmatrix}$$

where $E_x$ is the complex $x$ component of the electric field vector and $E_y$ the complex $y$ component. Both $x$ and $y$ are defined to be orthogonal coordinates in a plane perpendicular to the direction of propagation of the radiation field. The average state of polarization of the radiation field is generally described in terms of the time average of combinations of the $x$ and $y$ components. The coherency matrix is one such mathematical representation of these time averages. It is defined as:

$$J = \begin{pmatrix} J_{xx} & J_{xy} \\ J_{yx} & J_{yy} \end{pmatrix}$$

$$J = \begin{pmatrix} <E_x E_x>^* & <E_x E_y>^* \\ <E_y E_x>^* & <E_y E_y>^* \end{pmatrix}$$

where the angular brackets denote time averages. The intensity of the radiation field described by the coherency matrix J is:

$$I = tr\, J$$

where $tr$ denotes the trace of the matrix J. The degree of polarization of the radiation field P is given by:

$$P = \sqrt{1 - \frac{4 \det J}{tr\, J^2}}.$$

The coherency matrix J' of the radiation described by J after passing through a linear polarizer whose axis of polarization is inclined at an angle $\theta$ with respect to the $x$ axis is given by:

$$J' = L_p(\theta) J.$$

Where $L_p(\theta)$ is the projection operator representing the polarizer, $$L_p(\theta) = \begin{pmatrix} \cos^2\theta & \cos\theta \sin\theta \\ \sin\theta\cos\theta & \sin^2\theta \end{pmatrix}.$$

Thus the intensity of light described by the coherency matrix J when transmitted through a plane polarizer represented by $L_p(\theta)$ is:

$$I = tr(L_p(\theta) J).$$

The complex degree of coherence of a plane polarized wave with amplitude E(t) is defined by:

$$\gamma(\tau) = \frac{<E(t)\, E(t + \tau)^*>}{<E(t)>\, <E(t + \tau)>}$$

where $\tau$ is a temporal phase shift between the amplitudes, E(t) and E(t + $\tau$). This may be expressed in the form:

$$\gamma(\tau) = |\gamma(\tau)|\, e^{ig(\tau)}$$

where $|\gamma(\tau)|$ is the modulus of the complex degree of coherence and $g(\tau)$ the phase. $|\gamma(\tau)|$ is equivalent to the fringe visibility measured in an interferometric measurement of the light with a given path difference equivalent to the temporal phase shift $\tau$. Further, the complex degree of coherence is related to the coherence length through $$l_c = c\tau_c$$

where $c$ is the velocity of light and $\tau_c$ is the temporal phase shift for which the modulus of the complex degree of coherence falls to some prescribed value.

A key theoretical observation relevant to the present invention is that the coherence matrix of an initially plane polarized quasi-monochromatic radiation field whose polarization vector is oriented at an angle of 45° with respect to the $x$ axis and whose $x$ and $y$ resultant components have been made to pass through a retarder which introduces a phase shift $\tau$ between the $x$ and $y$ components is given by:

$$J(\tau) = I_{av}\begin{pmatrix} 1 & \gamma(\tau) \\ \gamma(\tau)^* & 1 \end{pmatrix}.$$

Where * is used in the customary manner to denote the complex conjugate. Furthermore, by careful algebraic manipulation it is easily shown that the degree of polarization of this radiation field is in fact identical to the modulus of the complex degree of coherence. Thus, it is now clear to one skilled in the art that if a light beam to be analyzed is first prepared in the state of polarization described above and then the $x$ component is retarded by a temporal phase shift $\tau$, the elements of the polarization coherency matrix describe the complex degree of temporal coherence of the light. Referring to the coherency matrix of the particular radiation field under discussion, it is clear that it is comprised of three independent components; the average intensity, the real part of the complex degree of coherence, and the imaginary part of the complex degree of coherence. Thus, only three measurements are required to calculate the elements of the coherency matrix for a specific value of $\tau$.

Referring now to FIG. 1 of the drawings, the present invention consists of a polarizer 1 which projects the incident radiation into a polarization state plane polarized at an angle 45° with respect to the x axis. The beam then passes through a retarder 2 whose slow axis is oriented parallel to the x axis. The beam then passes through an electro-optic phase modulator 3 whose electrically generated slow axis is parallel to the x axis. The retarder 2 in this preferred embodiment is made of a birefringent crystal with the slow axis parallel to the x axis. Many materials are possible for use as a retarder. One should be chosen consistent with the wavelength operating region of the instrument. Two examples of materials which may be employed are quartz and LiNbO$_3$ single crystals. The electro-optic modulator may be constructed using a material having a first or second order electro-optical effect. Such materials as KDP(KH$_2$PO$_4$), ADP(NH$_4$H$_2$PO$_4$), LiTaO$_3$, KD$_2$PO$_4$, and BaTiO$_3$ are known materials having a first order electro-optical effect. Materials such as BaNaNb$_5$O$_{15}$, SrTiO$_3$, and BaTiO$_3$ are known as materials having a second order electro-optical effect. The modulator shown in FIG. 1 is exemplified as a longitudinal Pockels cell utilizing the linear electro-optical effect with the modulating electric field applied parallel to the z axis (the direction of propagation of the light beam). The modulation voltage is derived from the voltage generator 15. This generator may consist of an oscillator driving a function generator which generates a periodic waveform such as a sine wave or triangular wave. Immediately after passing through the modulator 3 the coherency matrix of the light is given by:

$$J(\tau+\alpha) = I_{av}\begin{pmatrix} 1 & |\gamma(\tau+\alpha)|e^{ig(\tau+\alpha)} \\ |\gamma(\tau+\alpha)|e^{-ig(\tau+\alpha)} & 1 \end{pmatrix}$$

where $\alpha$ is the degree of phase modulation introduced by the electro-optical modulator 3. The degree of modulation $\alpha$ is a periodic function of time. In general the maximum value of $\alpha$ is small in relation to the retardation $\tau$. Thus, the phase $g(\tau+\alpha)$ of the complex degree of coherence will be strongly effected by the modulation but the modulus $|\gamma(\tau+\alpha)|$ will not, because in general for quasi-monochromatic light it is a much weaker function of phase difference.

The beam then passes into the beam splitting means 4 where it is spacially divided into two components. Two-thirds of the light passes out through the compensating element 5 (to be discussed in detail in a later section) to the beam splitting polarizer 6 which in the preferred embodiment is a Wollaston prism oriented so the x' plane polarized part of the beam passes to detector 8 through collection optics 7 and the y' plane passes to detector 10 through collection optics 9. x' is a vector oriented +45° (clockwise) with respect to the x axis when viewed along the direction of beam propagation. y' is oriented +90° (clockwise) with respect to the x' axis when viewed from the same location. Collection optics for each detector can vary from a complex lens system to a simple lens or mirror system. A lens with good correction for chromatic aberation and spherical aberation is the preferred optics for the present invention for use in the visible or near infared region of the spectrum. An off-axis parabola would be preferred and give good operation over wider regions of the spectrum with no chromatic aberation.

One-third of the beam entering the beam splitting means passes through the achromatic 90° retarder 11 which introduces a negative 90° phase shift between the x and y components. A preferred embodiment for the combination of elements 4, 5, and 11 is described in a later section. Light leaving the retarder 11 passed through an analyzing prism 12 of the Glan Thompson type through detector optics 13 which are identical in form to 7 and 8. This beam is collected at detector 14. The analyzing prism 12 is oriented to transmit light polarized along the x' direction.

The intensities measured by the detectors 8, 10, and 14 constitute three independent observations needed to calculate the three independent components of the coherency matrix of the light transmitted by the modulator 3. This is easily seen from the expression for the intensity of a beam transmitted through a polarizer oriented at an angle $\theta$ with respect to the x axis which can be derived from the projection operator $L_p(\theta)$ and the coherency matrix $$I(\theta, \tau+\alpha) = I_{av}[\sin^2\theta + \cos^2\theta + 2\sin\theta\cos\theta \, Re \, \gamma(\tau+\alpha)].$$

If the phase of the complex degree of coherence is shifted by $-\pi/2$ then the intensity becomes $$I'(\theta, \tau+\alpha) = I_{av}[\sin^2\theta + \cos^2\theta + 2\sin\theta\cos\theta \, Im \, \gamma(\tau+\alpha)].$$

Where $Re$ denotes the real part of a complex number and $Im$ the imaginary part. By comparing the independent variables of the intensity with operations performed on the light as it passes to each of the three detectors the following identifications can be made:

$$I_8 = I(\pi/4, \tau+\alpha)$$

$$I_{10} = I(3\pi/4, \tau+\alpha)$$

$$I_{14} = I'(\pi/4, \tau+\alpha).$$

By algebraic manipulation the following expressions can be derived:

$$Re \, \gamma(\tau+\alpha) = \frac{I_8}{I_8 + I_{10}} - 1$$

$$Im \, \gamma(\tau+\alpha) = \frac{I_{14}}{I_8 + I_{10}} - 1$$

thus, $$|\gamma(\tau+\alpha)| = \left\{\left(\frac{I_8}{I_8+I_{10}}-1\right)^2 + \left(\frac{I_{14}}{I_8+I_{10}}-1\right)^2\right\}^{\frac{1}{2}} \quad (1)$$

$$g(\tau+\alpha) = \arctan\left(\frac{I_{10}+I_8-I_{14}}{I_{10}}\right). \quad (2)$$

Thus, one skilled in the art can see that by performing the above mathematical operations on the outputs of the three detectors, the modulus and phase of the complex degree of coherence can be computed. The unit labeled computing means 70 performs these calculations and displays the results. In a later section the unit will be discussed.

Figure 2:
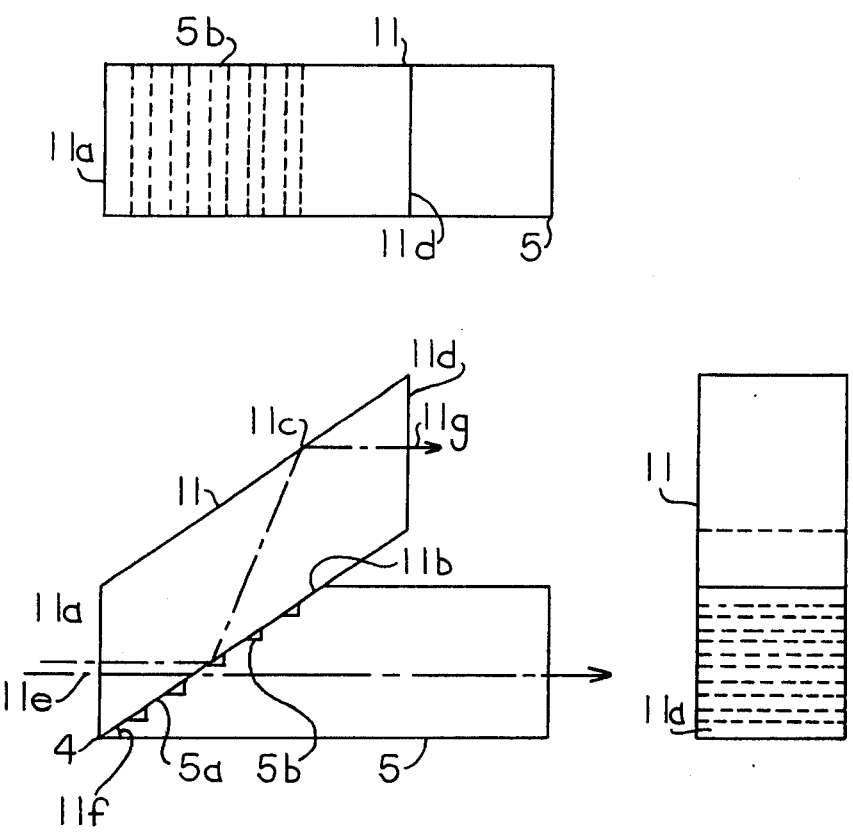
FIG. 2 is a three view drawing showing in detail the preferred embodiment of the beam splitting means and achromatic 90° phase shifter.

Referring now to FIG. 2 of the drawings, the beam splitting means 4, the compensator 5 and the achromatic 90° phase shifter 11 (Fresnel rhomb) are shown in detail. Light entering face 11a of the Fresnel rhomb 11 passes through the lower part of the rhomb and strikes the rear surface 11b. Surface 11b of the rhomb is in optical contact with surface 5a of the compensator 5. Surface 5a is derived into parallel strips by grooves 5b ground in the face of the compensator. Thus, wherever the surfaces 11b and 5a are in contact, as for ray 11e, light is transmitted through the compensator 5. The grooves are ground so that two-thirds of the light will be transmitted. The remaining light striking the surface 11b, as for ray 11g, is totally internally reflected through the remaining part of the achromatic 90° retarder where it is reflected one more time at surface 11c and is then transmitted through the exit face 11d. The surfaces 5a and 11b constitute the beam splitting means 4. The relative phase between the x and y components is shifted by 45° at each total internal reflection so that the total phase shift through the device is 90°. The compensator 5 is made of the same material as the achromatic 90° phase shifter 11 and is designed so that light passing through it will traverse approximately the same optical path length as light passing through the Fresnel rhomb 11. The purpose of the compensator is to achieve balanced absorption between the beam passing to detector 14 and the beams passing to detectors 8 and 10. Many different materials may be used to construct the Fresnel rhomb 11 and the compensator 5. However, the angle 11f must be adjusted for different refractive indices to give the correct phase shift between the x and y components on reflection. The total phase shift for two reflections is given by:

$$\delta = 4 \arctan \left( \frac{\cos\phi \sqrt{\sin^2\phi - n^2}}{\sin^2\phi} \right)$$

where $\phi$ is the angle 11f and $n$ the refractive index of the material. NaCl was chosen as the material for the preferred embodiment. This material has excellent transmission properties from the ultraviolet through to the far infrared. The angle 11f was calculated to be 55.888°. This gives a phase shift of 90° using a mean refractive index of 1.5265 which occurs between 1.0 micrometers and 5.0 micrometers wavelength. The total change in retardation between 1.0 and 5.0 micrometers due to normal dispersion in NaCl is only 1.52°. This is small enough so that it only slightly effects the operation of the system in this region. The number of grooves in surface 5a was chosen to be 5 to give a good average division of the light incident in case of slight variations intensity over the aperture. However, it should be noted that circular as well as crosshatched patterns could be used and the number of transmitting regions varied as long as the division of the beam is maintained in the same ratio.

Figure 3:
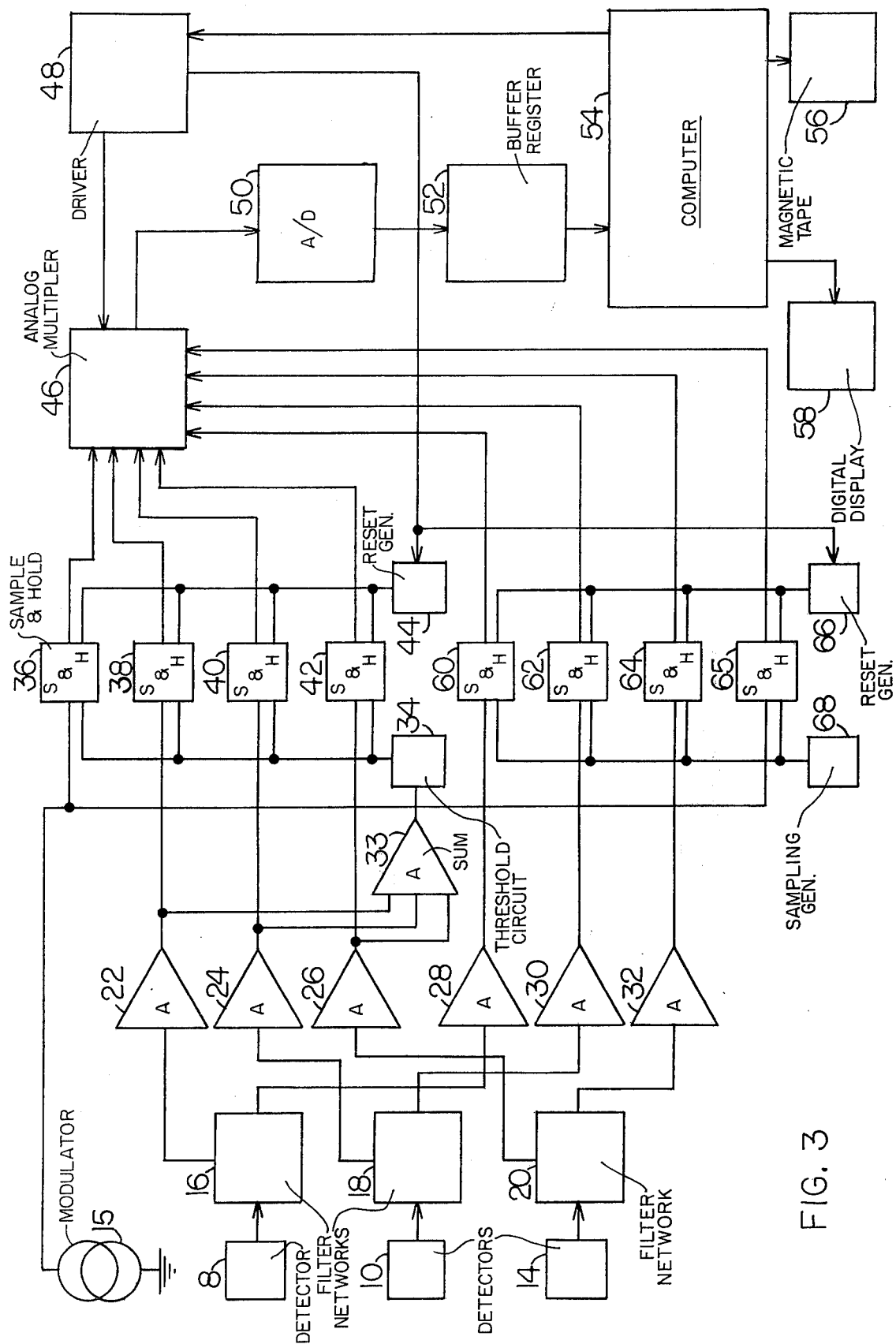
FIG. 3 is a schematic block diagram illustrating the preferred embodiment of the signal processing means necessary for calculating the complex degree of coherence.

Referring now to FIG. 3 of the drawings, the signal processing unit receives information from detectors 8, 10, and 14 in the form of an electrical signal proportional to the intensity of light falling on the detectors plus any noise and leakage current which may be present. The detectors and their respective biasing circuitry are sufficiently matched that the rms noise and leakage currents will be nearly the same. The output signals of the detectors 8, 10, and 14 are fed to filter networks 16, 18, and 20 respectively. These divide the signals into their pulsed and quasi-continuously modulated parts. The pulsed part of the signals are transmitted to pulsed amplifiers 22, 24, and 26 respectively. These amplifiers amplify the signals to levels necessary for linear operation of the sample and hold circuits 38, 40, and 42. The modulator voltage from 15 is also fed to a sample and hold circuit 36. The pulse amplifier circuits are also directed to a summing amplifier 33 with unity gain. The output of the summing amplifier 33 is fed to the threshold circuit 34. When the signal level at the input of the threshold circuit 34 crosses a certain level, the threshold circuit generates an output pulse which strobes the sample and hold circuits causing them to hold the peak input received so that digital information derived from the three pulsed intensities can be transfered to the computer for processing.

Quasi-continuous signals from the filters 16, 18, and 20 are fed to tuned amplifiers 28, 30, and 32 respectively. These amplifiers are tuned to the frequency of the modulator 15. The outputs of these amplifiers are fed to sample and hold circuits 60, 62, and 64. These circuits are strobed "on" by the sampling generator 68 periodically and with a specific relationship to the time sequenced input to the analogue multiplexer 46. During each data sampling time the analogue multiplexer, 46, sequentially presents the analogue information present at the outputs of all sample and hold circuits to the analogue to digital (A/D) convertor 50. The A/D convertor transforms the analogue signals into their digital equivalent and feeds this digital information into the buffer register 52. The mini computer 54 transfers data from the buffer register into prescribed storage locations. A driver circuit 48 is used to select the state of the multiplex of 46 in a well known manner and in accordance with the above description of operation.

At the end of data transfer from sample and hold circuits 36, 38, 40, and 42 reset generator 44 resets these circuits to "zero" in readiness for receiving measurements on the next pulse received. After data from sample and hold circuits 60, 62, 64, and 65 are transfered to the computer reset generator 66 resets them to zero. With the data from each of the eight sample and hold circuits stored in its memory the mini computer calculates the phase and amplitude of the complex degree of coherence utilizing algebraic expressions (1) and (2) derived above. This calculation is carried out for the case of pulses by identifying $I_8$ with the signal derived from 38, $I_{10}$ with the signal derived from 40, the $I_{14}$ with the signal derived from 42. The value of the modulation voltage from 15 through 36 is also stored in the computer. The modulation voltage is converted into retardation $\alpha$. Upon receiving of two pulses of optical radiation with significantly different values of modulation present say $\alpha_1$ and $\alpha_2$ with the mean wavelength of the incident pulse can be calculated from the expression that follows:

$$\lambda_0 = \frac{(2\pi c)(\alpha_1 - \alpha_2)}{g_1(\tau - \alpha_1) - g_2(\tau + \alpha_2)}$$

This wavelength calculation will be in error if values of $\tau$ and $\alpha$ computed for paraxial rays are used with the incident optical beam received at some angle with respect to the instrument axis. Care must be exercised to compute corrected values of $\tau$ and $\alpha$ based on information regarding the direction of incoming light in order to insure accurate wavelength measurement. It is a straight forward procedure for one skilled in the art to make such a calculation for a specific embodiment. For the sake of brevity no such calculation will be included here.

As more pulses are received the computer will continue to calculate wavelength from successive pulses and average the calculations. The running average of wavelength and modulus of the complex degree of coherence are displayed by suitable digital means 58 and blocks of calculated results as well as measured data recorded on magnetic tape 56. The quasi-continuous data stored in 60, 62, and 64 is treated in the same way as pulsed data with the exception that many more data points are available for averaging. The following identifications are made in handling this data: $I_8$ is the analogue signal stored in 60, $I_{10}$ is the analogue signal stored in 62, and $I_{14}$ the analogue signal stored in 64. The signal corresponding to the modulation value, $\alpha$, at the time of sampling is stored in 65. The computed average wavelength and modulus of the complex degree of coherence for quasi-continuous signals are displayed on a designated part of the display means 58 and are recorded at specific time intervals on magnetic tape 56.

For one skilled in the art of analogue and digital data processing and recording, it will be obvious that the above scheme is only one of many possible ways of processing, displaying, and recording data according to the teachings of this disclosure. For example, a completely analogue means could be used for processing. Also, in some specific applications, it may be desired only to have a real time display or real time recording, but not both. Furthermore, for the sake of brevity no mention was made of an AGC (automatic gain control) for the amplifiers. This is easily designed for the present system by one skilled in the art after reading the above teachings and need not be elaborated here.

Obviously numerous additional modifications and variations of the present invention are possible in light of the above teachings. It is therefore to be understood that within the scope of the appended claims, the invention may be practiced otherwise than as specifically described herein.

Accordingly, I claim:

1. An apparatus for studying the coherence of beams of optical radiation comprising:
    a. optical means for polarizing the radiation;
    b. means for dividing the resulting polarized beam into two independent orthogonally polarized components;
    c. means for generating a phase retardation between the two independent orthogonally polarized components;
    d. optical elements for projecting the beam into at least two independent states of polarization such that at least two intensities are provided which supply information needed to calculate the independent elements of the coherency matrix;
    e. means for detecting at least two independent intensities and thereafter converting them into electrical analogue signals; and
    f. means for calculating the complex degree of coherence from said at least two independent intensities.

2. An apparatus for studying the coherence of beams of optical radiation as in claim 1 wherein said optical means comprises Glan Thompson polarizing prism to polarize the optical radiation.

3. An apparatus for studying the coherence of beams of optical radiation as in claim 1 wherein said means for dividing the resulting polarized beam into two independent orthogonally polarized components and for generating a phase retardation between the two components is comprised of: a birefringent optical crystal oriented so that the plane formed by the optic axis of the crystal and the direction of propagation of the said polarized beam lies at an angle of 45° with respect to the plane of polarization of said polarized beam.

4. An apparatus for studying the coherence of beams of optical radiation as in claim 1 wherein: said coherency matrix analyzing means comprises; a Fresnel rhomb frustrated by a compensator at a series of positions across the aperture thereby dividing the beam by total internal reflection at points not frustrated, having means for passing portions of the divided beams through the compensator and Fresnel rhombs respectively, having means for passing the beam which suffered the achromatic 90° phase shift caused by two total internal reflections in the rhomb through a polarization analyzer and collection optics onto a detector, and passing the beam which is transmitted through the compensator into a polarizing beam splitter where the resulting two beams are allowed to impinge on two other detectors.

5. An apparatus for studying the coherence length of beams of optical radiation as in claim 4 wherein:
    said means of calculating the complex degree of coherence and mean wavelength comprises; amplifying and sampleing means a multiplexer, an analogue to digital converter, and followed by a digital computer with stored program for solving equations related to said intensities and a display and recording means.

6. An apparatus for studying the coherence of beams of optical radiation as in claim 1 wherein:
    said intensities are recorded using digital or analogue technique for analysis at a later time.

7. An apparatus for studying the coherence of beams of opticlal radiation as in claim 1 wherein:
    said intensities are transformed into electrical analogue signals which are then allowed to pass through electrical filters such that pulses temporal components are separated from the quasi-continuous temporal components the pulse temporal components being amplified using wide band amplifiers while the quasi-continuous temporal components are amplified by D.C. amplifiers so that both pulsed and quasi-continuous temporal components of the beams of optical radiation can be simultaneously analyzed.

8. An apparatus for studying the coherence of beams of optical radiation as is recited in claim 1 wherein said optical elements projected the beam into three independent states of polarization, so as to provide three intensities as an output therefrom.

* * * * *